Feb. 24, 1925.
C. S. MACDONALD
1,527,809
BRACELET HOOK
Filed April 8, 1924
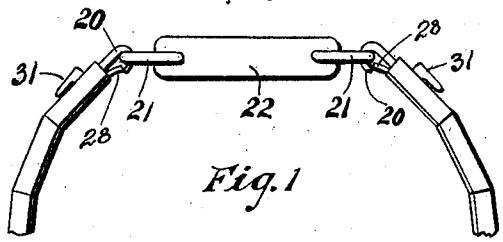
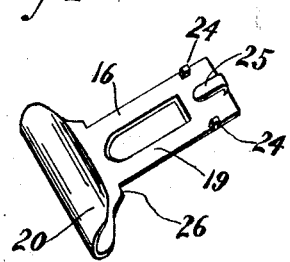
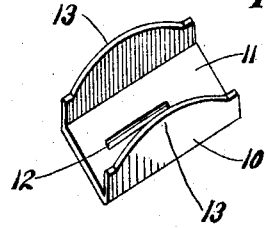
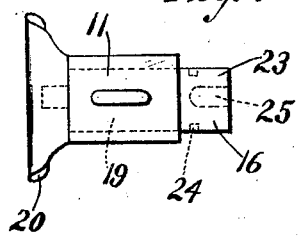
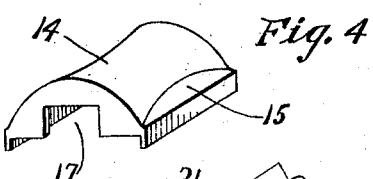
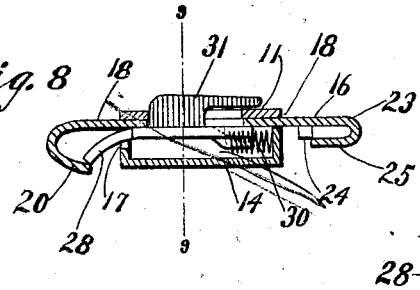
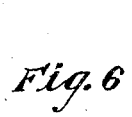
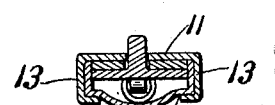
Inventor
Creighton S Macdonald
By Barlow & Barlow
Attorneys Patented Feb. 24, 1925.

1,527,809

UNITED STATES PATENT OFFICE.

CREIGHTON S. MACDONALD, OF ATTLEBORO, MASSACHUSETTS, ASSIGNOR TO INDEPENDENT MFG. CO., INC., OF ATTLEBORO, MASSACHUSETTS, A CORPORATION OF RHODE ISLAND.

BRACELET HOOK.

Application filed April 8, 1924. Serial No. 704,959.

*To all whom it may concern:*

Be it known that I, CREIGHTON S. MACDONALD, a citizen of the United States, residing at Attleboro, in the county of Bristol and State of Massachusetts, have invented certain new and useful Improvements in Bracelet Hooks, of which the following is a specification.

This invention relates to a hook or connector more particularly adapted for attaching the ends of a bracelet to a wrist watch and the like: and the object of this invention is to provide a hook of this character which is simple and practical in construction and which is provided with a slidable tongue member arranged to normally close the hook to prevent it from becoming inadvertently detached from the watch.

With these and other objects in view, the invention consists of certain novel features of construction, as will be more fully described, and particularly pointed out in the appended claims.

In the accompanying drawings:—

Figure 1 is a side elevation showing a watch and indicating the ends of a chain or bracelet as connected to the sides of the watch by my improved hook links.

Figure 2 is a perspective view of the hook member detached from the hook link.

Figure 3 is a perspective view of the outer body member of the hook link.

Figure 4 is a perspective view of the inner body members of the hook link.

Figure 5 is a perspective view of the closing tongue member of this hook link.

Figure 6 is a side elevation of this tongue member.

Figure 7 is a top view showing the hook member as housed in the body portion of the hook.

Figure 8 is a sectional side elevation of my improved hook and showing the tongue as closing the hook portion.

Figure 9 is a sectional end elevation on line 9—9 of Figure 8.

It is found in the practical construction and operation of hook links of this character, of advantage to mount a sliding tongue member in the body portion of the link and to provide an operating presser finger extending through the wall of the link which may be readily operated for the purpose of withdrawing the locking tongue member to permit the hook to be readily attached to and detached from the watch when desired: and the following is a detailed description of one construction by which this result may be accomplished:—

With reference to the drawings, 10 designates the outer body member of the hook link which is provided with a front wall 11 slotted at 12 and having side walls 13 between which is set the inner or under body member 14 which is provided with laterally extending flanges 15 over which the marginal edges of the side walls 13 of the upper member are rolled or folded to lock these two body members securely together.

In a space between these body members, I have mounted the shank portion 19 of the hook member 16, which shank extends through openings 17 and 18 in the opposite end walls of the body member and this hook portion extends forwardly from the body, its outer end being preferably broadened and folded over to form a hook 20 to engage the bail of a watch 22. The rear end 23 of the shank of this hook member extends out beyond the rear end of the hook link and is provided with side edge fingers 24 and an end finger 25, by which this shank member may be connected to the next adjacent link or other element of the chain or bracelet.

It will be noted that the end wall of the next adjacent link, when positioned between the finger 24 and the end wall of the body 14, will cooperate with the shoulders 26 at the outer end of the hook member to lock this hook shank against an endwise motion in either direction in its body member, the shoulders 26 preventing a rearward motion while the finger 24 prevents a forward motion of the hook.

In order to provide a closure for the mouth of the hook, I have provided a plate member 27 which is slidably mounted in the body member, at one end of which plate is formed a tongue 28 which extends forwardly beyond the body normally bridging the mouth of the hook, and at the rear end of this plate is a finger 29 cut from the stock of the plate and around which the inner end of the spring 30 is wound while the opposite end of the spring abuts against the rear end wall of the link. This plate is also provided with a presser or operating finger 31 which extends up through this slot 12 in the front plate in position to be engaged to operate the tongue plate whereby a rearward pressure on this member moves the tongue rearwardly against its spring pressure to open the mouth of the hook and when released the spring naturally forces the plate forward causing its tongue to again close the hook.

My improved hook link is very simple and practical in construction and effective in its operation and by its use the hook may be locked in position against being inadvertently disengaged from the watch and by a simple operation of the presser member the hook may be opened to be disconnected when desired.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A watch bracelet hook having a body portion, a separate sheet metal member fixedly housed in said body and extending therefrom with a hook-shaped end adapted to be passed through the bail of a wrist watch, and a spring-pressed tongue slidably mounted in said body and having a portion closing said hook.

2. A watch bracelet hook having a body portion with a slot in one wall thereof, a sheet-metal hook-shaped member extending from said body and adapted to be passed through the bail of a wrist watch, a spring-pressed tongue member slidably mounted in said body to normally close said hook to lock it in bail-engaging position, and a projection on said tongue extending through said slot to be manually engaged to withdraw said tongue to open the hook.

3. A bracelet hook having a body portion with a slot in its front wall, a separate member fixed in said body and having a hook-shaped extending end, a plate slidable in said body having a rearwardly-extending finger and a forwardly-extending tongue to normally close said hook, an operating spring having one end mounted on said finger and its other end abutting against a portion of said body, and a presser member on said plate extending through said slot by which said tongue may be withdrawn from hook-engaging position.

In testimony whereof I affix my signature.

CREIGHTON S. MACDONALD.